Dec. 23, 1958     S. C. HETH ET AL     2,865,461
ROOT CROP HARVESTER
Filed Sept. 19, 1955     3 Sheets-Sheet 3
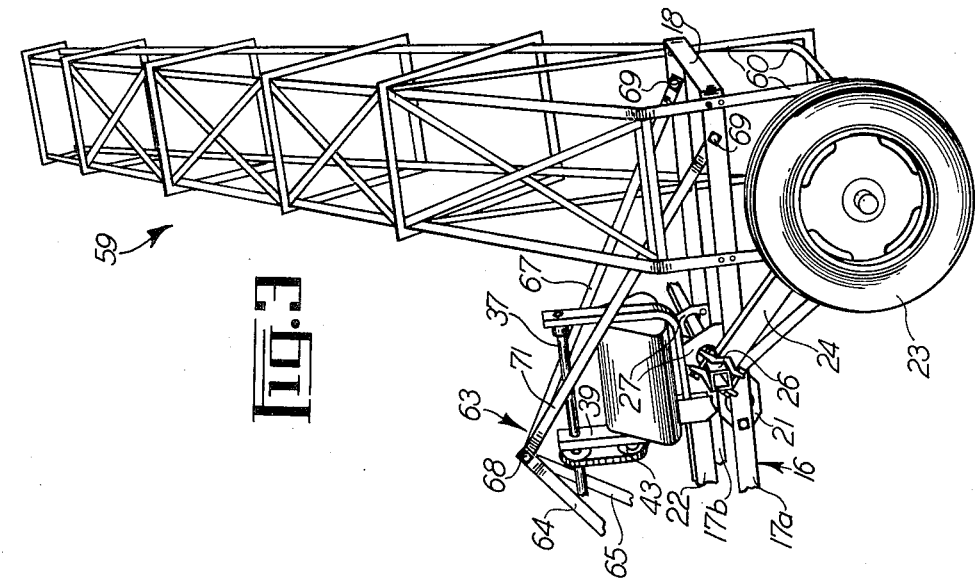
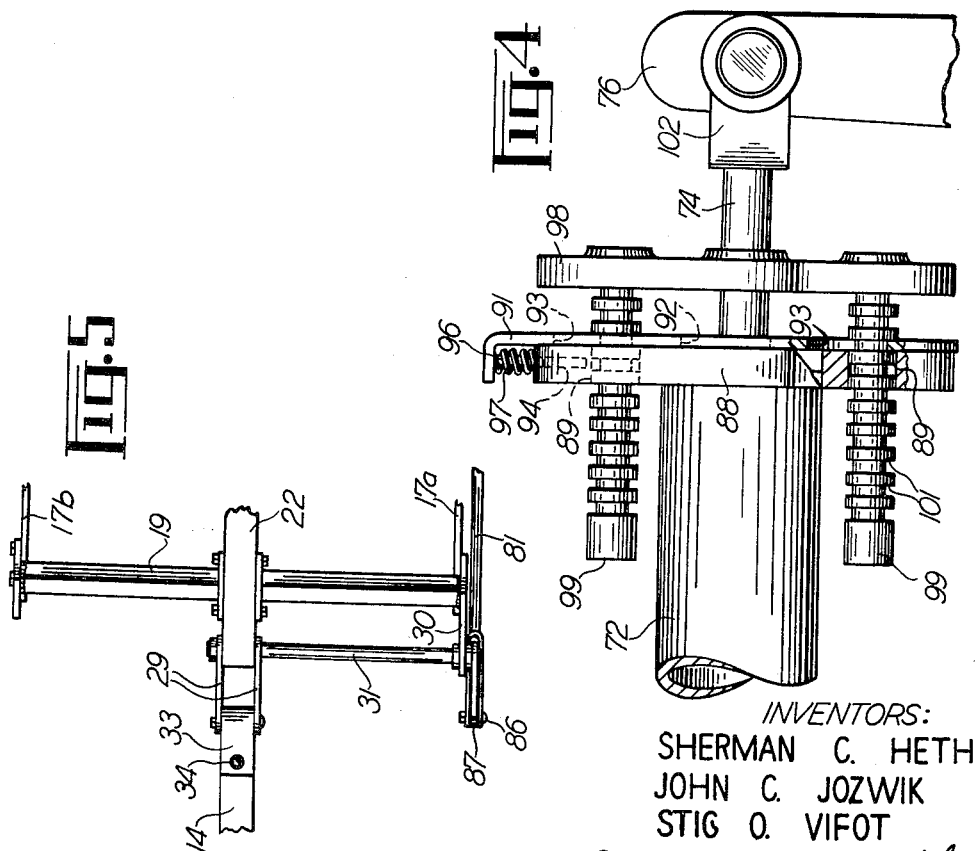
INVENTORS:
SHERMAN C. HETH
JOHN C. JOZWIK
STIG O. VIFOT
BY: Emerson B Donnell
ATTORNEY

United States Patent Office 2,865,461
Patented Dec. 23, 1958

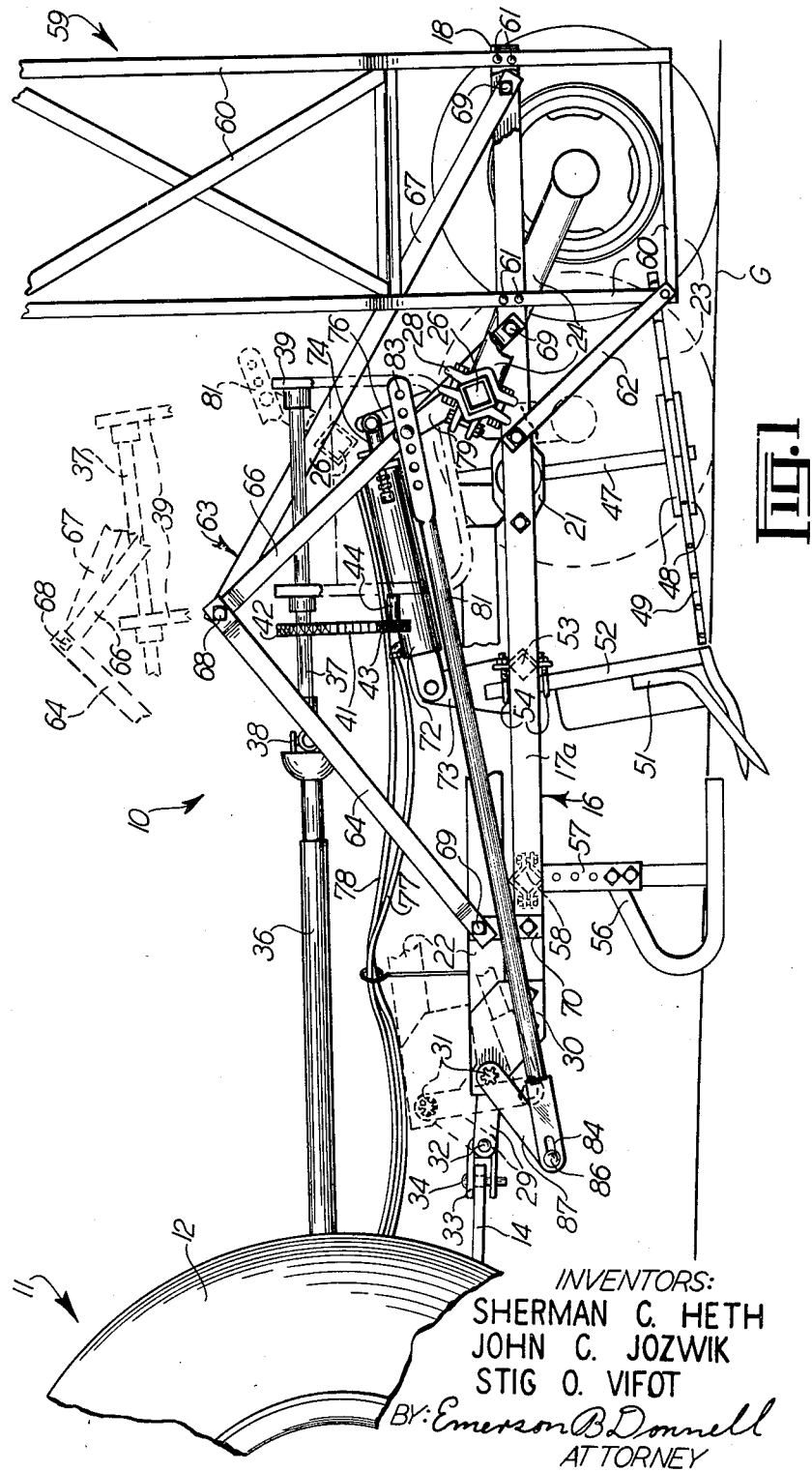

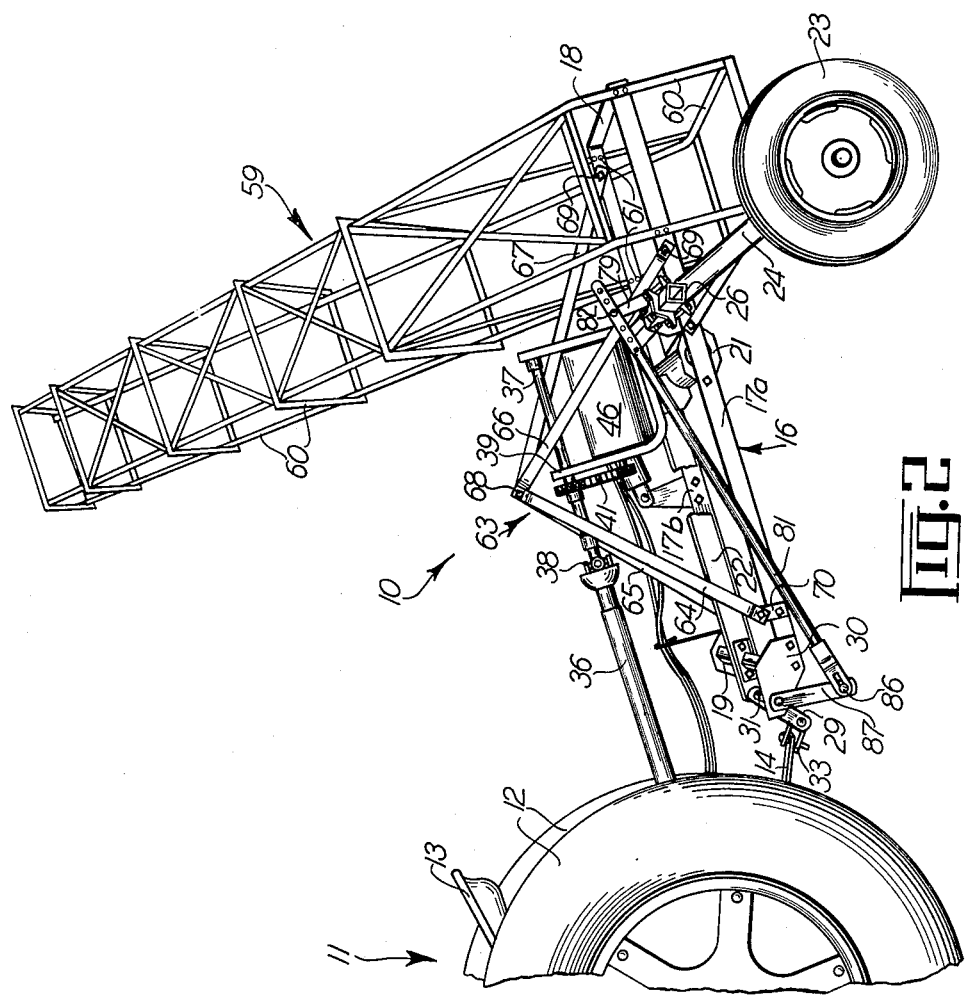

2,865,461

ROOT CROP HARVESTER

Sherman C. Heth, John C. Jozwik, and Stig O. Vifot, Racine, Wis., assignors to J. I. Case Company, Racine, Wis., a corporation of Wisconsin Application September 19, 1955, Serial No. 534,963

5 Claims. (Cl. 171—141)

This invention relates to a root harvester for plants such as potatoes, beets, and like underground crops, and, more specifically, it relates to the supporting and positioning of certain parts of the harvester.

It is an object of this invention to provide a root harvester for underground crops wherein the crop working parts are readily and accurately raised and lowered between the transport or inoperative position and the working or operative position. The accomplishment of this object permits the harvester to be set in either of the two positions by a simple maneuver without re-adjusting the position as the harvester will always return to the same working position, for instance, and thus be at the same depth of ground penetration.

A further object is to provide a root harvester having a spinner which can be tilted to a selected desired angle of operation.

Another object of this invention is to provide a root harvester for underground crops wherein the harvester is structurally sturdy and thus capable of proper ground engagement and handling of the crops without undue distortion of the harvester frame.

Other objects and advantages will become apparent upon reading the following description in conjunction with the accompanying drawings, wherein, Fig. 1 is a side elevational view of a preferred embodiment of this invention with parts broken away and parts removed, and with the transport position of certain parts shown in dotted lines.

Fig. 2 is a reduced side perspective view of the embodiment shown in Fig. 1 but with the harvester in the transport position and with certain parts removed and certain parts shown more fully.

Fig. 3 is a fragmentary rear side perspective view of a modification of the embodiment shown in Fig. 2 but with parts removed.

Fig. 4 is an enlarged fragmentary side view of certain parts of the embodiment shown in Fig. 1.

Fig. 5 is a fragmentary top plan view of certain parts shown in Fig. 2.

The same reference numerals refer to the same parts throughout the several views.

Figs. 1 and 2 show a root harvester 10 draft and power attached behind a tractor 11 of which only a fragment of the rear wheels 12 and the seat 13 is shown plus the usual tractor hitch or drawbar 14. The harvester 10 is shown with some of the parts removed to simplify and clarify the drawing, and it should be understood that the harvester is for the purpose of harvesting root crops such as potatoes, beets, and like underground crops.

The harvester is composed of a frame 16 having opposite side pieces 17a and 17b, a rear piece 18, and a front cross-piece 19, all attached together, with the rear and front pieces attached to the side pieces as shown. Also, a transversely disposed center cross-piece 21 is attached between the side pieces 17a and 17b, and a longitudinally disposed piece 22 is attached between the front piece 19 and the center piece 21, and the piece 22 is shown broken away for convenience of drawing. Two wheels 23 are mounted through two arms 24 at opposite ends of a square shaped axle shaft 26 which is rotatably attached across the frame 16 in mounting brackets 27 shown in Fig. 3. Thus, the shaft 26 is rotatable about its axis and in the brackets 27. The upper ends of the arms 24 are attached to the shaft 26 through clamps 28 so that the arms 24 and the shaft 26 are non-rotatable with respect to each other. It should thus be understood that the wheels 23 support the rear end of the harvester on the ground indicated "G" in Fig. 1.

The front end of the harvester is supported by the tractor hitch 14 through two links 29 pivotally attached to the front end of the longitudinal piece 22 by a rod 31 rotatably mounted on the piece 22 and side 17a, as best shown in Fig. 5. A plate 30 supports the outer end of the rod 31 on the frame piece 17a. The links 29 are non-rotatable with respect to the rod 31 for a purpose mentioned later. The forward ends of the links 29 pivotally attach through a bolt 32 to a clevis 33 secured to the hitch 14 through a pin 34. The harvester is thus supported on its wheels and the tractor to be draft attached to the latter.

Rotatably connected to the power take-off (not shown) at the rear of the tractor is the usual self-telescoping shaft 36 which rotatably attaches to a shaft 37 through a universal joint 38. The shaft 37 is rotatably mounted in a U-shaped support 39 which is mounted on the center cross-piece 21 in any well-known manner. A chain 41 is engaged with a sprocket 42 on the shaft 37 and a sprocket 43 on a jack shaft 44 also rotatably mounted on the support 39. The shaft 44 extends within a housing 46 attached between the legs of the support 39 to enclose gears which mesh to rotatably engage the shaft 37 with an upright shaft 47 shown in Fig. 1. For clarity of disclosure, Fig. 1 shows the support 39 and housing 46 in dot-dash lines which permit viewing the parts behind those two pieces. Thus, rotative power can be transmitted from the tractor, through the parts described, and to the shaft 47.

The lower end of the shaft 47 attaches through two plates 48 to a plurality of transversely disposed and spaced apart tines 49. The shaft, plates, and tines comprise the usual spinner of a root harvester. Fig. 1 further shows the usual beet lifter 51 suitably attached to a tool standard 52 which is dependent from a horizontally disposed tool bar 53 (shown dotted) to which the standard is attached by U-bolts 54, all in any well-known manner of mounting beet lifters on root harvesters. Thus, the tool bar 53 is suitably attached at its ends to the sides 17a and 17b of the frame. Similarly, a guide runner 56 is attached to depend from the frame 16 through an adjustable standard 57 bolted to a forward tool bar 58 (shown dotted).

With this arrangement, when the harvester is towed along a row of beets, for example, the guide runner 56 is disposed to slightly penetrate the ground and engage beets which are out of alignment and move them into alignment with the row. The beet lifter 51 next engages the beets to take them out of the ground and deposit them onto the spinner tines 49 from where the beets are carried by the rotating spinner to the rear of the harvester and are dropped onto an elevator 59. Only the frame structure of the elevator is shown, with its frame pieces 60, and it is shown only fragmentarily in Fig. 1. The lower end of the elevator is shown bolted to the frame 16 through bolts 61. Also, a brace 62 is shown bolted between the frame 16 and the elevator 59. As shown in Figs. 2 and 3, the elevator is angularly disposed to overhang the frame 16 as the angle of the elevator with respect to the approximately horizontal plane of the frame 16 is approximately forty-five degrees. Since the elevator receives the beets from the spinner to convey the beets high to the top of the elevator for deposit into a trailing wagon, the elevator is necessarily heavy and is of a cantilever type of mounting. Therefore, the elevator places considerable twisting strain on the frame 16 as the elevator tends to tip the frame and harvester. As shown, the near side piece 17a is twisted upwardly by the weight of the elevator and the far side piece 17b is twisted downwardly by the weight of the elevator. Of course, the axle shaft 26 and cross-piece 21 resist the twisting effect at their points of attachment to the frame. To relieve the frame 16 of the strain, a pyramid shaped super structure 63 is attached to the frame as described hereinafter.

Fig. 2 shows the structure 63 to consist of three bars 64, 65, and 66 of substantially equal length, and a fourth bar 67 of a longer length. The four bars are joined at their upper ends to form an apex secured together by a bolt 68. The lower and opposite ends of the four bars are suitably bolted to the frame 16 by bolts 69 at the spaced apart points shown. The bar 64 is shown attached to the frame 16 through a bracket 70 which is rigidly bolted to the frame to extend thereabove. The bar 65 is similarly attached. It will be noted that Fig. 3 shows a modification of the structure 63 in that the bar 66 is omitted and in its place is a longer bar 71 which is secured to the frame 16 by one of the bolts 69 at a point rearward of the frame attachment of the omitted bar 66.

In this manner, both embodiments of the structure 63 form a series of triangles between every two adjacent bars and the frame 16 with the top apex of the triangle rigidly secured against movement. Thus, the twisting force on the frame is resisted by the compressive property of the bar 66 and the tensile property of the bar 67 as these two bars maintain the frame in position. Since the bars 66 and 67 are joined by the bolt 68, the tendency of the upper ends of the bars 66 and 67 to be displaced is resisted by the bars 64 and 65 with the bar 64 being under tension and the bar 65 being under compression. Thus, the weight of the harvester frame is a minimum while the structure is sufficiently sturdy and rigid to support the sizeable over-hanging weight of the elevator.

Figs. 1 and 2 show a hydraulic ram or power means or force applying means 72 pivotally anchored at one end to a plate 73 mounted on the frame 16 with the opposite end of the ram containing a piston 74 pinned to an arm 76 which is attached, in any suitable manner, at its lower end to the axle shaft 26 to be non-rotatable with respect to the shaft. The usual hydraulic hoses 77 and 78 are connected from opposite ends of the ram cylinder to the power supply of the tractor. Thus, in the usual manner, hydraulic pressure in the hose 77 causes the piston 74 to extend out of the cylinder to rotate the arm 76 and the shaft 26. Rotation of the latter causes the wheels 23 to move to the dotted position, for instance, of Fig. 1 and the shaft 26 is raised to its dotted position shown, along with the raising of the other parts to the positions indicated by dotted lines. This is the position shown in Fig. 2. In this manner, the harvester is raised and lowered by the well-known action of the ram 72.

A second arm 79 is attached to the axle shaft 26 to be non-rotatable with respect thereto and thus rotate with the shaft. The upper end of the arm is pivotally attached to a tie rod 81 by a bolt 82 engaged in one of a plurality of holes 83 in the end of the rod. The opposite end of the rod 81 contains a slot 84 which receives a bolt 86 to pivotally connect the rod with a draft link 87. The latter is splined to the rod 31, as are the links 29, so that actuation of the ram 72 to raise the harvester and move the rod 81 to the position indicated by dotted lines showing the ends of the rod in Fig. 1 causes the rod or shaft 31 to be rotated and raised as the rod 81 pulls on the link 87. The latter thus moves to its dotted line position and the links 29 assume their dotted line position to support the front of the harvester in a raised position for transport, with the runner guide, beet lifter, and spinner all raised clear of the ground. The slot 84 in the rod 81 permits movement between the rod 81 and the link 87 in the event an object or a rise is encountered on the ground by the guide or beet lifter to act upwardly on the front end of the harvester. The bolt 86 can then slide in the slot 84 as the link 87 rotates counterclockwise about the rod 31 as viewed in Fig. 1. The parts are thus not subjected to undue strain as they would be if the connection were a rigid one, and the connection is thus a lost motion connection, and the shaft 31 with the links 29 and 87 form a bell crank.

Of course, the selection of the hole 83 in the rod 81 for engagement with the arm 79 determines the relative rotative positions between the rod 31 and the shaft 26 and thus the angle of the frame 16 with respect to the ground for a given elevation of the tractor hitch. Thus, moving the bolt 82 and the arm 79 to one of the holes 83, closer to the end of the rod 81, will cause the rear end of the frame 16 to be raised and thus be more angularly disposed with respect to the ground, and the spinner is accordingly more angular. Moving to a more inwardly disposed one of the holes 83 will, of course, cause the rear end of the harvester to be lowered.

For controlling the length of stroke of the piston 74, Fig. 4 shows the piston is provided with a flange 88 having holes 89 passing therethrough. A plate 91 is slidably disposed on the flange 88 with an opening 92 for permitting reciprocal movement of the piston through the plate 91. Also, the latter contains openings 93 which are approximately aligned with the flange holes 89. Further, the flange 88 contains a hole 94 which is aligned with a pin 96 attached to the plate 91, as shown, and a coil spring 97 is disposed around the pin 96 to urge the plate 91 upwardly on the flange 88 for a reason mentioned later. It will also be noted that a second plate 98 is disposed over the piston rod with a suitable central opening in the plate for axial movement of the rod through the plate. The latter has a pair of studs 99 attached thereto for projecting through the openings 93 and 89. A plurality of annular grooves 101 are formed in the studs 99 to receive the plate 91 at the edges of the holes 93 in the plate as the plate is urged upwardly to engage the studs in its grooves. It should be obvious that with this arrangement the plate 98 can be spaced from the cylinder at a selected distance and locked in that position through the studs 99 and the plate 91. Thus, an enlarged yoke 102 on the end of the piston is attached to the arm 76 through the pin shown, and the yoke is not able to pass through the plate 98 and, therefore, it abuts the plate to limit the length of stroke of the piston.

With the described arrangement of the hydraulic ram, the harvester can be raised and lowered between two selected points so that, for instance, the harvester can be lowered to the same working position after each time it has been raised.

While specific embodiments of this invention have been shown and described, it should be obvious that certain changes could be made in the embodiments and the invention should, therefore, be limited only by the scope of the appended claims.

We claim:

1. In a root crop harvester of the type attachable to a hitch of a tractor to be towed by the latter on the ground and having a crop digging implement and rotating spinner assemblage for receiving said crops from the ground upon advancement of said harvester and sensitive in operation to fore and aft tilting, the combination of a frame, a hitch mechanism pivotally mounted on the front end of said frame for pivotal movement into positions of different elevations with respect to said frame, wheel and axle means pivotally connected to said frame for supporting the latter at various elevations determined by the pivotal position of said wheel and axle means with respect to said frame, a rod joined between said hitch mechanism and the pivotal connection of said wheel and axle means with said frame for transmitting pivotal movements between said hitch mechanism and said wheel and axle means, force applying means operatively associated with said wheel and axle means, and a lost motion connection forming the joint between said rod and said hitch mechanism for permitting upward movement of said front end of said frame in response to irregularities in ground traversed.

2. A root crop harvester comprising a frame, a pivotal axle on said frame having a wheel carrying crank connected thereto, power means interconnecting said crank and said frame, a draft link pivotally connected to a front end portion of said frame, and a rigid tie rod interconnecting said link and said crank, said tie rod including a pin and slot connection.

3. A root crop harvester comprising a frame, a pivotal axle on said frame having a wheel carrying crank connected thereto, force applying means interconnecting said crank and said frame, a draft link pivotally connected to a front end portion of said frame, and a tie rod interconnecting said link and said crank, said tie rod including a lost motion connection.

4. A root crop harvester for draft attachment to a tractor, comprising a frame, a pivotal axle on said frame having a wheel carrying axle crank connected thereto, force applying means interconnecting said axle crank and said frame, a bell crank pivotally connected to a front end portion of said frame and including two links with one link thereof attachable to said tractor and the other link disposed in a plane below said one link and projecting downwardly and to the front with respect to said harvester, and a tie rod interconnecting said other link and said axle crank for restricting pivotal movement of said bell crank in a direction to cause said other link to pivot upwardly about the axis of said bell crank, said tie rod including a lost motion connection.

5. A root crop harvester comprising a frame, a pivotal axle on said frame having a wheel carrying crank connected thereto, force applying means interconnecting said crank and said frame, a draft link pivotally connected to a front end portion of said frame, a tie rod interconnecting said link and said crank, said tie rod including a lost motion connection, and means associated with said tie rod for selective alteration of the effective length of said tie rod between the interconnecting points with said link and said crank.

References Cited in the file of this patent

UNITED STATES PATENTS

| | | |
|---|---|---|
| 1,234,637 | Cummings | July 24, 1917 |
| 2,248,505 | McKahin | July 8, 1941 |
| 2,320,742 | Newkirk | June 1, 1943 |
| 2,537,118 | Andersen et al. | Jan. 9, 1951 |
| 2,580,432 | Jensen | Jan. 1, 1952 |
| 2,605,885 | Baldwin | Aug. 5, 1952 |
| 2,665,533 | Bozeman et al. | Jan. 12, 1954 |